Jan. 30, 1945. D. H. BIERMAN 2,368,589
LIQUID DEPTH ASCERTAINING MEANS
Filed June 21, 1943
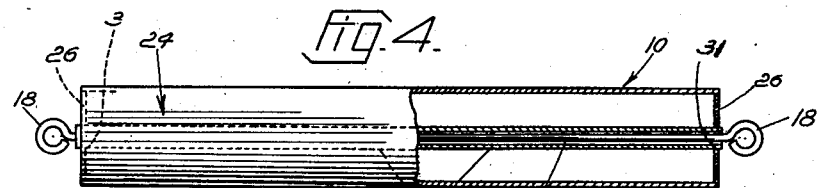
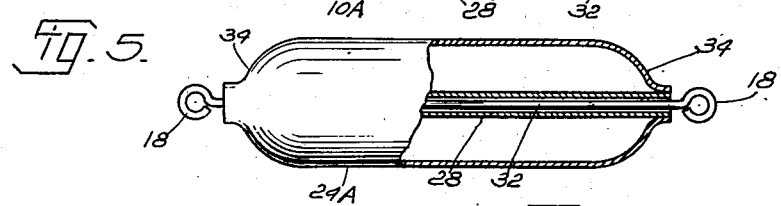
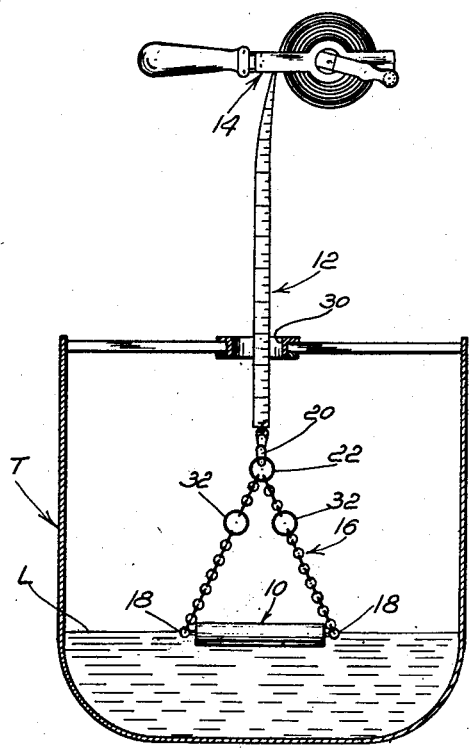
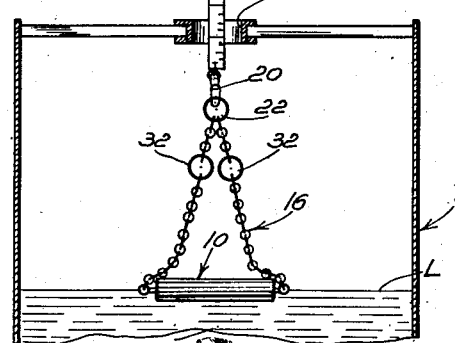
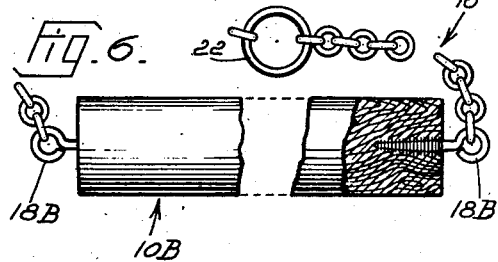
Inventor
DANIEL H. BIERMAN
Attorney Patented Jan. 30, 1945

2,368,589

UNITED STATES PATENT OFFICE 2,368,589

LIQUID-DEPTH ASCERTAINING MEANS

Daniel H. Bierman, Malverne, N. Y., assignor to Petrometer Corporation, Long Island City, N. Y., a corporation of New York Application June 21, 1943, Serial No. 491,643

12 Claims. (Cl. 73—305)

This invention relates to means for ascertaining or determining the depth of liquid in a tank, floating dry-dock ballast water compartment, tanker fuel compartments, molasses tanks or other liquid container.

One object of the invention is to provide means for readily ascertaining the depth of a liquid in a container without being required to immerse the measuring device in the liquid. In this connection it will be understood that when a measuring rod or stick is immersed in the liquid in a container in order to ascertain the depth of liquid therein, the wetting of said rod or stick is relied upon for indicating the depth of said liquid. That method of determining liquid depth is undesirable because in the case of clear liquids, for example, water, gasoline, etc., the measuring device is not marked sufficiently clearly by the liquid to afford an easily observable indication on the measuring device. On the other hand, when the liquid is a viscous liquid, for example, molasses, heavy oils, etc., the coating of the measuring device by such liquid makes it necessary to clean the measuring device each time the latter is used. These and other objections to that method are eliminated by the present invention, which, as stated, makes unnecessary the immersion of the measuring device in the liquid for ascertaining the depth thereof.

Another object of the invention is the provision of means for obtaining increased accuracy in ascertaining the depth of liquid in a container.

A further object is to provide a float of improved construction for use as part of means for ascertaining liquid-depths.

A further object is the provision of a flexible connection between the float and the measuring device whereby the measuring device is relieved of the weight of the float and the float is not pushed downwardly into the liquid by the measuring device when the float is lowered into the container.

A yet further object is to facilitate the insertion of the float into the container and the removal of the float therefrom.

The above and other objects, features and advantages of the invention will be fully understood from the following description, reference being had to the accompanying illustrative drawing.

In the drawing:

Fig. 1 is a view of liquid-depth ascertaining means embodying the present invention and illustrates more or less diagrammatically the use of said means;

Fig. 2 is a view illustrating a part of the operation of using the means of the present invention;

Fig. 3 illustrates the manner of inserting and removing the float in and from the liquid container;

Fig. 4 is a side view of a float embodying the present invention, a part being cut away for the purpose of illustration;

Fig. 5 is a view similar to Fig. 4 showing a float of a different construction;

Fig. 6 is a view of a wooden or non-metallic float.

Referring now to the drawing in detail, the liquid-depth ascertaining means of the present invention comprises a float 10, a measuring device here shown as a flexible metal tape 12 supplied from a reel 14 of any suitable type, and a lost motion connection 16 between the measuring device or tape and the float. Preferably, as here shown, said lost motion connection is constituted by a flexible metal chain connected at its opposite ends to the opposite ends of the float 10, more particularly, to the eyelets 18 fixed at its opposite ends of said float, the intermediate or mid-point of said chain being releasably connected to the end of the tape 12 in any suitable way as by means of a snap hook 20 which engages the ring 22 positioned at the mid-point of the chain as one of the links thereof.

The float 10 may be of various forms, but is preferably of the form illustrated either in Fig. 4 or Fig. 5. First, with respect to the form of the float 10 illustrated in detail in Fig. 4, said float comprises, as here shown, a longitudinally extending hollow cylinder 24 formed of sheet metal or other suitable material closed at its opposite ends by circular disks 26. A cylindrical tube 28 of small diameter is disposed within cylinder 24 and extends for the full length of the latter, the ends of said tube being secured in apertures 30 formed in the closure disks 26. A rod 32 extends through tube 28 and is provided with the above mentioned eyelets 18 to which the ends of the chain which constitutes the lost motion connection 16 are connected. It will be understood that cylinder 10 is free to turn or rotate around rod 32. Further it will be understood that closure disks 26 have a liquid tight connection with cylinder 24 and with tube 28 so that no liquid can enter the interior of said cylinder, and it is to be noted that by reason of the small diameter of the tube 28 the effect of any liquid which may enter said tube is negligible. Thus, float 10 is constructed to be buoyantly supported by the liquid in the tank or container T as illustrated in Figs. 1 and 2.

The manner of utilizing the means of the present invention is apparent from an examination of Figures 1 to 3. Fig. 3 illustrates the manner of inserting and removing the float 10 and the lost motion connection or chain 16 into and out of the tank in which the depth of the liquid L is to be ascertained. More particularly, when, as shown in the drawing, the tank or other container T is provided with a comparatively small opening 30, the float 10 and the chain 16 are positioned as illustrated in Fig. 3 so that said float and chain can be passed through said opening into or out of the tank. In order to facilitate handling of the chain 16 the latter is provided with rings 32 which are larger than the links of the chain. By grasping the chain at one of said links 32, the float 10 is vertically disposed so that it and the chain can pass through said opening. After the float 10 and the chain 16 are passed through opening 30 into the tank T, the float 10 is allowed to rest on the liquid in the tank as illustrated in Fig. 2 with the chain 16 slack so that the tape or measuring device 12 is relieved of the weight of the float and chain. Then, the tape 12 is moved upwardly to take up the slack in the chain, but without raising the float from the liquid, as illustrated in Fig. 1 and then a reading is taken on the chain for ascertaining the depth of liquid in the tank. It will be understood that the chain is properly calibrated to provide an accurate indication of the depth of the liquid and it will be noted that the tape may have measuring indications so arranged on the tape as to indicate directly the depth of liqud in the tank or the indications may be so arranged as to indicate the depth of the empty part of the tank. After the depth of liquid is ascertained by taking a reading on the tape 12, the float is removed from the tank by raising the tape 12 until the links 32 are positioned externally of the tank above the opening 30 to permit grasping of one of said rings so that the float can be vertically positioned for removal from the tank through said opening. It will be observed that the vertical positioning of the float for the removal thereof from the container, as illustrated in Figure 3, is easily accomplished, pursuant to my invention, by the cord or chain 16 and that it is unnecessary to attach other means to the float for that purpose, since said cord or chain 16 is of such length and is so connected to the float, i. e., preferably to the opposite ends thereof, that the part of the chain which is at one side of the midpoint and nearer one end of the float than the part of the chain at the other side of said midpoint can be grasped for raising said first mentioned end of the float while said last mentioned part is slack and therefore does not interfere with the lowering of the opposite end of the float. Thus, the same cord or chain by which the float is connected to the measuring tape 12 can be used for removing the float from the container through the comparatively small container opening 31.

The float 10A illustrated in Fig. 5 is of the same construction as the float 10 except that, as here shown, the end closure disks 26 are omitted and instead the end portions 34 of the float cylinder 24A are spun down to the diameter of the tube 28 and are secured to said tube in fluid-sealing relation therewith. The float 10B illustrated in Fig. 6 is formed of wood being, as here shown, a solid cylinder to which the eyelets 18B are connected for the attachment of the chain or lost motion connection 16. It will be understood that the floats 10A and 10B are used in the same way as float 10 illustrated in Figs. 1 to 4. Further it will be understood that the float 10B may have a longitudinally extending central bore therethrough for a rod 32 so that the wooden cylinder can turn on or rotate around said rod in the same way as the floats 10 and 10A. The provision of the rod 32 to which the ends of the chain 16 are connected, while not essential, is advantageous and, therefore, preferred, since the turning of the cylinder 24 and 24A on the companion rod 32 prevents the winding of the ends of the chain 16 around the eyelets 18 which might occur when the cylinder of the float is in fixed relation to said eyelets.

The chain 16 which provides a flexible and lost motion connection between the tape 12 and the float 10 is a special feature of the present invention as it affords means for indicating when the float is supported by the liquid in the tank and for preventing the float from being forced down into the liquid, since following the insertion of the float into the tank the weight of the float on the tape is relieved as soon as the float is buoyantly supported by the liquid. The user of the apparatus thus obtains an accurate "feel" of the liquid level and by taking up the slack in the chain 16 without raising the float from the liquid, an accurate indication of the depth of the liquid in the tank can then be obtained by reading the tape. It will be understood that the reading on the tape may be taken at any suitable reference line, for example, at the top of the opening 30 which is at the top of the tank, and where great accuracy is required, a correction factor for the thickness of the top of the tank, although usually unnecessary, may be applied.

It will be understood that the measuring tape 12 will be calibrated so that the scale indications thereon allow for the vertical distance from the end of the tape to the float. Also it will be understood that the full depth of the interior of the container may be determined by detaching the float from the measuring device and attaching instead a plumb bob of such length that the distance from the end of the tape to the lower end of the plumb bob is the same as the distance from said end of the tape to the float when the latter is attached thereto as illustrated in Fig. 1. Accordingly, when a reading is taken on the tape the depth of the liquid in the container is easily obtained by subtracting said reading from the full depth of the interior of the container. Also it will be understood that when the depth of the interior of the container is known, the tape or other measuring device may be calibrated so that the scale indications give direct indications of the depth of liquid in the container or, alternatively, said scale may be calibrated so as to indicate directly the depth of the container above the level of the liquid therein.

While I have shown and described the preferred embodiment of my invention, it will be understood that the latter may be embodied otherwise than as herein shown or described and that various changes may be made in the illustrated forms of the invention. Further it will be understood that instead of the tape illustrated as the measuring device, a chain or any other suitable measuring device may be used. Accordingly, I do not wish to be limited to the invention as herein specifically illustrated or described except to the extent which may be required by the scope of the appended claims.

Having thus described my invention, what I claim and desire to secure by Letters Patent is:

1. Means for use in ascertaining the depth of liquid in a container, said means comprising a float adapted to be buoyantly supported by the liquid in the container, said float being of greater length than width and adapted to be removed endwise through a container-opening which is narrower than the length of said float but sufficiently wide to permit endwise movement of the float therethrough, and a flexible cord or chain connected to the opposite ends of said float and adapted to be connected at a mid-point thereof to a measuring device, the length of said chain being such that when a part thereof between said mid-point and the nearer end of said float is held in vertical position, the other part of said chain is slack so that an upward pull of said first part of the chain positions said float vertically for said endwise movement thereof through the container-opening.

2. Means for use in ascertaining the depth of liquid in a container, said means comprising a float adapted to be buoyantly supported by the liquid in the container, said float being of greater length than width and adapted to be removed endwise through a container opening which is narrower than the length of said float but sufficiently wide to permit endwise movement of the float therethrough, and a flexible cord or chain connected to the opposite ends of said float and adapted to be connected at a mid-point thereof to a measuring device, the length of said chain being such that when a part thereof between said mid-point and the nearer end of said float is held in vertical position, the other part of said chain is slack so that an upward pull of said first part of the chain positions said float vertically for said endwise movement thereof through the container-opening, said chain having a ring at its mid-point for connection to a measuring device and rings at opposite sides of said first ring and spaced therefrom longitudinally of the chain providing means for grasping the chain at either side of said mid-point for holding either of said parts of the chain in position for imparting said upward pull thereto while the other part of the chain is slack.

3. Means for ascertaining the depth of liquid in a container, said means comprising a float adapted to be buoyantly supported by the liquid and adapted to be connected to said tape by a lost motion connection whereby a measuring tape can be moved vertically downwardly in relation to said float when the latter is supported in said container, said float being of greater length than width and adapted to be removed endwise through a container-opening which is narrower than the length of said float but sufficiently wide to permit endwise movement of the float therethrough, and a flexible cord or chain connected to the opposite ends of said float and adapted to be connected at a mid-point thereof to a measuring device, the length of said chain being such that when a part thereof between said mid-point and the nearer end of said float is held in vertical position, the other part of said chain is slack so that an upward pull of said first part of the chain positions said float vertically for said endwise movement thereof through the container-opening.

4. In means for ascertaining the depth of liquid a float adapted to be buoyantly supported by the liquid and adapted to be connected to a measuring device a rod on which said float is mounted for turning movement, and means for connecting the opposite ends of said rod to said measuring device.

5. A float for liquid-depth ascertaining means in which the float is connected to a measuring device, said float comprising a hollow body, a tube disposed within said body and extending longitudinally thereof, said body being closed at its ends, and a rod extending through said tube longitudinally thereof and adapted to be connected at its opposite ends to said measuring device, said body being turnable around the longitudinal axis of said rod.

6. A float for liquid-depth ascertaining means in which the float is connected to a measuring device, said float comprising a hollow body, a tube disposed within said body and extending longitudinally thereof, said body being closed at its ends, and a rod extending through said tube longitudinally thereof and adapted to be connected at its opposite ends to said measuring device, said body being turnable around the longitudinal axis of said rod, and a flexible chain connected to the opposite ends of said rod.

7. A float for liquid-depth ascertaining means in which the float is connected to a measuring device, said float comprising a hollow body and members positioned at the opposite ends of said hollow body and connected thereto so that said body can turn in relation to said members, said members providing means for the attachment to said body of flexible means for connecting said body to the measuring device.

8. A float for liquid-depth ascertaining means in which the float is connected to a measuring device, said float comprising a hollow cylindrical body, end closure disks at the opposite ends of said body, said disks having aligned central apertures, a tube disposed within and extending longitudinally of said hollow body and secured in said disk apertures and a rod extending through said tube longitudinally thereof and adapted to be connected at its opposite ends to said measuring device, said body being turnable around the longitudinal axis of said rod.

9. A float for liquid-depth ascertaining means in which the float is connected to a measuring device, said float comprising a hollow cylindrical body, the opposite end portions of said cylindrical body being narrower than the intermediate longitudinally extending portion thereof, a tube disposed within and extending longitudinally of said hollow body and connected to said end portions thereof, and a rod extending through said tube longitudinally thereof and adapted to be connected at its opposite ends to said measuring device, said body being turnable around the longitudinal axis of said rod.

10. A float for liquid-depth ascertaining means in which the float is connected to a measuring device, said float comprising a hollow body and members positioned at the opposite ends of said hollow body and connected thereto so that said body can turn in relation to said members, and flexible means connected to said members for connecting said float to said measuring device.

11. A float for liquid-depth ascertaining means in which the float is connected to a measuring device, said float being substantially cylindrical, and means on which said cylindrical float member is mounted for rotation about its longitudinal axis, said last mentioned means having provision for the connection thereof to said measuring device.

12. A float for liquid-depth ascertaining means in which the float is connected to a measuring device, said float being substantially cylindrical, means on which said cylindrical float member is mounted for rotation about its longitudinal axis, and flexible means connected to said last mentioned means for connecting said float to said measuring device.

DANIEL H. BIERMAN.